July 30, 1935.  K. WIESSELL  2,009,912

HARVESTER REEL

Filed March 31, 1934  2 Sheets-Sheet 1

Inventor:
K. Wiessell
By
Glascock Downing Seebold
Attorneys

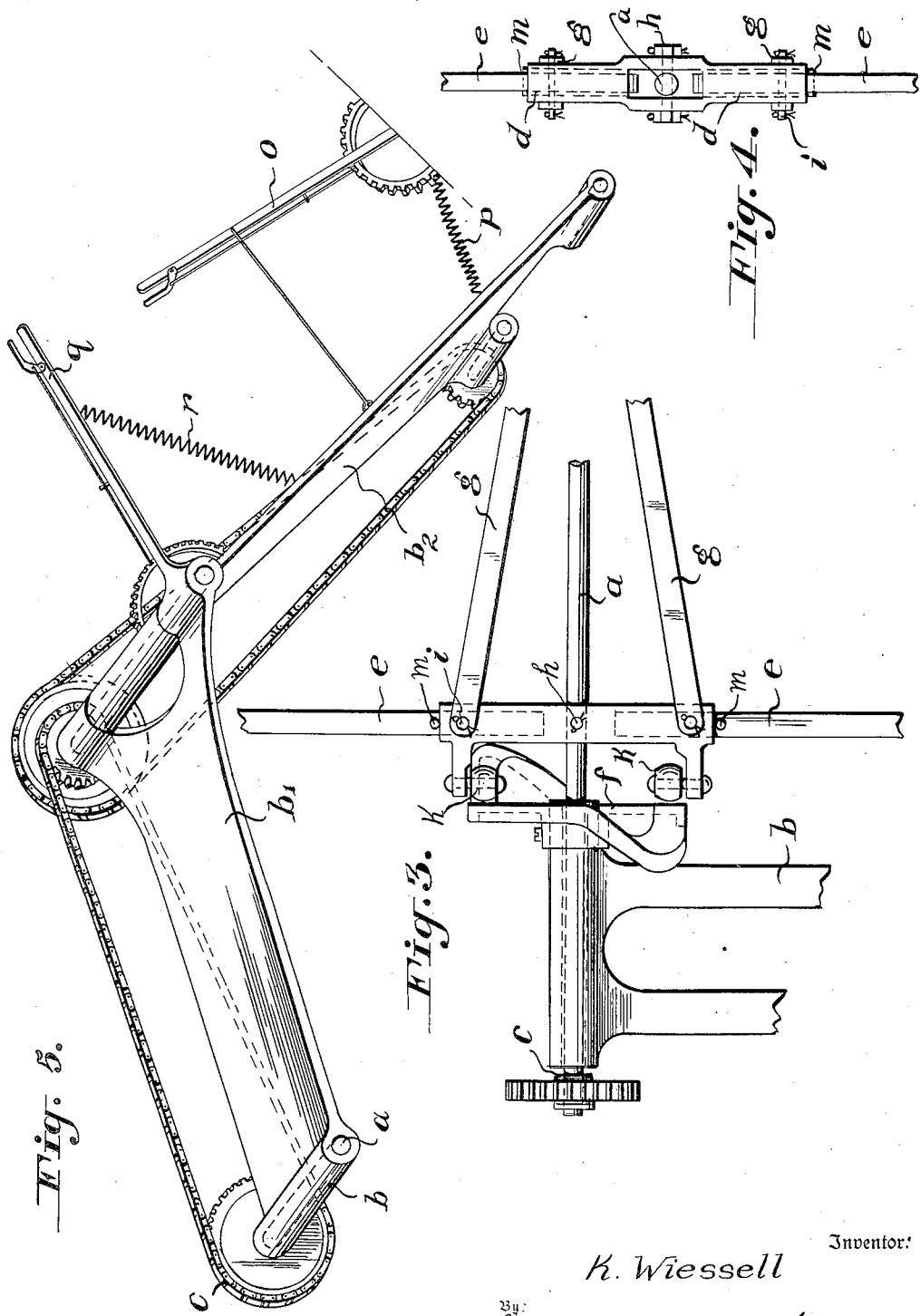

Patented July 30, 1935

2,009,912

UNITED STATES PATENT OFFICE 2,009,912

HARVESTER REEL

Kurt Wiessell, Schwusen, Kreis Glogau, Germany

Application March 31, 1934, Serial No. 718,499
In Germany October 3, 1932

4 Claims. (Cl. 56—226)

This invention relates to harvester reels for raising lodged grain immediately before it is cut by the reaping machine.

There are numerous types of such reels in existence, and those that give particular satisfaction in practical operation are provided with ears' lifters which go below the grain from the side and thus are capable of raising grain lying in any direction.

The known types of reels of this class suffer, however, from the drawback that the tips of the ears' lifters controlled by an oblique circular disc describe a circular or elliptic path and thus are spaced differently from the ground while operating on the grain. For this reason, during their entire lateral motion, the ears' lifters are unable to pick up with their tips flatly lodged grain which they can take up only when the tips are on a level with it and thus can enter it during further lateral motion. In this way, the working width of the harvester and therefore the efficiency thereof are considerably reduced.

The invention proposes to eliminate these defects by arranging the ears' lifters secured to a horizontal reel shaft disposed vertically to the direction of travel so as to be oscillatory with respect to a point of the reel shaft and by constructing and controlling them so that during their engagement with the grain their tips describe a line parallel or approximately parallel to the ground and adjustable as to height. It is advantageous to arrange several simultaneously acting ears' lifters side by side on the same reel shaft with their tips pointing preferably towards one another. The outer ears' lifters may be provided with casings for guiding overhanging ears to the conveyor.

Figure 1:
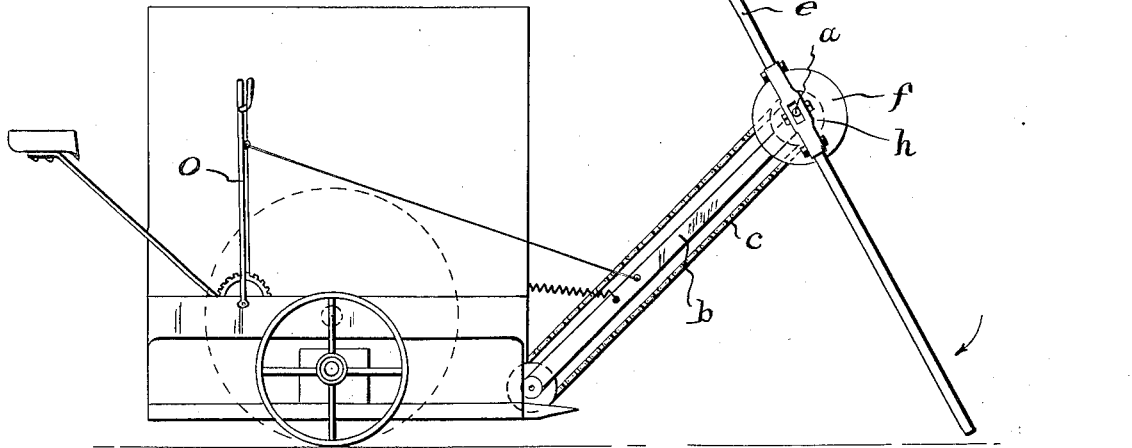
Figure 2:
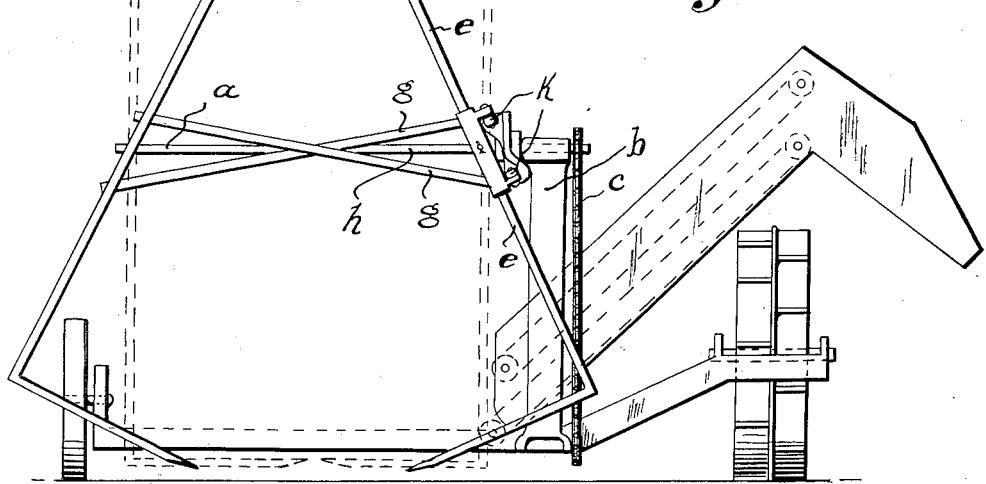

By way of example, the invention is illustrated in the accompanying drawings, in which Figure 1 is a side view of the new reel arrangement in connection with a harvester and binder; Fig. 2, a front view thereof; Fig. 3 shows on an enlarged scale the cam control of the reel; Fig. 4 shows how the ears' lifters' bars are secured; and Fig. 5 shows a preferred form of reel carrier by means of which the reel is adjustably secured to the self-binder.

Referring to the drawings, the harvester reel is arranged about the horizontal shaft $a$ disposed vertically to the direction of travel of the harvester in a bearing $b$ and rotated by a suitable driving mechanism $c$. Around a point of the shaft $a$ the ears' lifters $e$ are arranged which are so constructed and controlled that during their engagement with the grain they describe a line parallel or approximately parallel to the ground. Fig. 2 indicates how the tips of the reel disposed in front of the cutter of the harvester describe for instance a line parallel to the ground while the reel moves out of the position shown in Fig. 1 into the vertical position indicated by broken lines in Fig. 2.

The ears' lifters are preferably secured by securing to the shaft $a$ the sleeves $d$ which can move about a bolt $h$ and in which the ears' lifters $e$ are held by pins $m$, as indicated in Figs. 3 and 4. By means of the pins $i$ push bars $g$ are articulated to the sleeves $d$. On the side of the bearing $b$ the rolls $k$ are fitted which move over a fixed cam $f$ secured to the bearing $b$ and thus bring about lateral motion of the ears' lifters $e$ during rotation of the shaft $a$ by means of the bars $g$ and the sleeves $d$. The just described manner of securing and controlling the parts may of course be replaced by any other way of fastening and control permitting the desired action on the ears' lifters.

The number and the arrangement of the ears' lifters on the reel may be chosen at will, it being preferable, however, to employ, in addition to several successively acting ears' lifters arranged in the form of a cross, a plurality of simultaneously acting ears' lifters so as to increase the working width of the machine. In this case, the simultaneously acting lifters are preferably arranged so as to point with their tips towards one another and thus to grip the grain like tongs.

It is advisable to provide the outer ears' lifters or the crosses formed by them with casings to guide overhanging ears to the conveyor and prevent their loss on the field.

The reel can be secured to the harvester in various ways, and preferably in such a manner that the height of the parallel line described by the tips of the lifters above the ground can be adjusted at will. An example of this manner of securing the reel to the machine is shown in Fig. 5 where the device consists of two articulated parts $b_1$ and $b_2$, one of which is secured to the harvester and the other carries the reel shaft $a$. In this device, the lever $o$ provided with a compensating spring $p$ adjusts the distance of the reel from the harvester and the lever $q$ fitted with the compensating spring $r$ the height of the reel above the ground.

The reel according to the invention operates as follows: When the harvester begins to move forward, the reel shaft $a$ is caused to rotate by the driving device $c$, the ears' lifters $e$ cooperating in the rotation of the shaft $a$. Owing to the motion of the rolls $k$ on the cam $f$, the bars $g$ are actuated and bring about a swinging motion of the ears' lifters $e$ relative to the pin $h$. The ears' lifters are arranged and controlled so that by the combination of rotary motion about the axis of the shaft $a$ and swinging motion about the pivots $h$, their tips, after engaging the grain in the position I in Figs. 1 and 2 move inwardly toward each other and describe a line which is parallel or approximately parallel to the ground. This takes place for instance during a reel rotation of 35°. The height above the ground to be maintained by the tips of the lifters while describing a line parallel to the soil can be adjusted at will to suit requirements, e. g., the height of the lodged grain, on the carrying device.

As to the movement of the lifters $e$ it is to be noted that they move about an axis constituted by the shaft $a$ during rotation of the latter, but in addition they execute a swinging or auxiliary movement about the pivot points $h$ and the latter movement is so timed by the arrangement of the cam $f$ and wheels $k$ rolling thereon, that when the lifters are in the position indicated by full lines in Figs. 1 and 2 the lower portions thereof are tilted outwardly; in moving about the axes $h$ approach the ground. As the rotary motion about the shaft $a$ progresses the tips of the lifters approach each other because of the movement about the pivot points $h$. The lifters $e$ thereby maintain substantially parallel relation with the ground throughout a portion of their movement contiguous thereto.

I claim:—

1. In a harvester reel, a harvester frame, a horizontal shaft rotatably mounted on the frame, a plurality of members oscillatably secured to said shaft and adapted to lift and arrange stems of grain into a position to be cut and means mounted on the frame for controlling the oscillation of the members whereby the tips of said members, when approaching the ground and while rotating and oscillating describe a line approximately parallel to the ground.

2. A harvester reel as claimed in claim 1, wherein the grain lifting members are arranged in pairs, side by side on the shaft, and further comprise a plurality of links connecting each pair whereby the pairs oscillate simultaneously.

3. A harvester reel as claimed in claim 1, wherein the grain lifting members are arranged in opposed pairs and further comprising a plurality of links connecting each pair whereby the pairs oscillate simultaneously.

4. A harvester reel as claimed in claim 1, comprising means for adjusting the height of said horizontal shaft above the ground.

KURT WIESSELL.